(12) United States Patent
Modarres et al.

(10) Patent No.: US 9,971,409 B2
(45) Date of Patent: May 15, 2018

(54) PASSIVE STIFFNESS AND ACTIVE DEFORMATION HAPTIC OUTPUT DEVICES FOR FLEXIBLE DISPLAYS

(71) Applicant: Immersion Corporation, San Jose, CA (US)

(72) Inventors: Ali Modarres, Montreal (CA); Juan Manuel Cruz-Hernandez, Montreal (CA)

(73) Assignee: Immersion Corporation, San Jose, CA (US)

(*) Notice: Subject to any disclaimer, the term of this patent is extended or adjusted under 35 U.S.C. 154(b) by 39 days.

(21) Appl. No.: 15/196,981

(22) Filed: Jun. 29, 2016

(65) Prior Publication Data

US 2016/0306427 A1 Oct. 20, 2016

Related U.S. Application Data

(63) Continuation of application No. 14/262,403, filed on Apr. 25, 2014, now Pat. No. 9,405,368.
(Continued)

(51) Int. Cl.
*G06F 3/01* (2006.01)
*G06F 3/0488* (2013.01)
(Continued)

(52) U.S. Cl.
CPC .............. *G06F 3/016* (2013.01); *G06F 1/163* (2013.01); *G06F 1/1641* (2013.01);
(Continued)

(58) Field of Classification Search
None
See application file for complete search history.

(56) References Cited

U.S. PATENT DOCUMENTS 4,330,730 A 5/1982 Kurz et al.
6,160,540 A 12/2000 Fishkin et al.
(Continued)

FOREIGN PATENT DOCUMENTS

CN 1444758 A 9/2003
CN 1502166 A 6/2004
(Continued)

OTHER PUBLICATIONS

Coelho, M. and Zigelbaum, J., "Shape-changing interfaces," Pers. Ubiquit Comput. 15:161-173 (2011).
(Continued)

*Primary Examiner* — Joseph Haley
(74) *Attorney, Agent, or Firm* — Kilpatrick Townsend & Stockton LLP

(57) ABSTRACT

A system includes a flexible display configured to display an image and a sensor connected to the flexible display. The sensor is configured to sense an amount of flexure of the flexible display. A haptic output device is connected to the flexible display and is configured to change a resistance to movement of a first portion of the flexible display relative to a second portion of the flexible display upon receipt of a haptic control signal. The system includes a processor in signal communication with the flexible display, the sensor and the haptic output device. The processor is configured to receive an output signal from the sensor based on the amount of flexure and generate the haptic control signal based on the output signal from the sensor.

27 Claims, 7 Drawing Sheets

Related U.S. Application Data

(60) Provisional application No. 61/816,605, filed on Apr. 26, 2013.

(51) Int. Cl.

| | | |
|---|---|---|
| *G06F 1/16* | (2006.01) | |
| *G06F 3/041* | (2006.01) | |
| *G06F 3/045* | (2006.01) | |
| *G06F 3/0487* | (2013.01) | |

(52) U.S. Cl.
CPC .......... *G06F 1/1643* (2013.01); *G06F 1/1652* (2013.01); *G06F 3/045* (2013.01); *G06F 3/0412* (2013.01); *G06F 3/0414* (2013.01); *G06F 3/0416* (2013.01); *G06F 3/0487* (2013.01); *G06F 3/0488* (2013.01); *G06F 3/04883* (2013.01); *G06F 2203/04102* (2013.01); *G06F 2203/04104* (2013.01)

(56) References Cited

U.S. PATENT DOCUMENTS

| | | |
|---|---|---|
| 6,337,678 B1 | 1/2002 | Fish |
| 6,429,846 B2 | 8/2002 | Rosenberg et al. |
| 6,803,924 B1 | 10/2004 | Snibbe et al. |
| 6,819,304 B2 | 11/2004 | Branson |
| 6,819,312 B2 | 11/2004 | Fish |
| 6,819,316 B2 | 11/2004 | Schulz et al. |
| 7,196,688 B2 | 3/2007 | Schena |
| 8,427,433 B2 | 4/2013 | Edwards et al. |
| 8,502,788 B2 | 8/2013 | Cho |
| 9,696,803 B2 | 7/2017 | Cruz-Hernandez et al. |
| 2002/0044132 A1 | 4/2002 | Fish |
| 2002/0054060 A1 | 5/2002 | Schena |
| 2002/0108439 A1 | 8/2002 | Whitehead |
| 2003/0174121 A1 | 9/2003 | Poupyrev et al. |
| 2003/0179190 A1 | 9/2003 | Franzen |
| 2004/0041800 A1 | 3/2004 | Daniels |
| 2004/0217877 A1 | 11/2004 | Kokonaski et al. |
| 2004/0233161 A1 | 11/2004 | Shahoian et al. |
| 2005/0030292 A1 | 2/2005 | Diederiks |
| 2005/0040962 A1 | 2/2005 | Funkhouser et al. |
| 2005/0057528 A1 | 3/2005 | Kleen |
| 2006/0099808 A1 | 5/2006 | Kondo |
| 2006/0194619 A1 | 8/2006 | Wilcox et al. |
| 2006/0211217 A1 | 9/2006 | Xu et al. |
| 2007/0211036 A1 | 9/2007 | Perkins |
| 2008/0261057 A1 | 10/2008 | Slobodin |
| 2008/0266273 A1 | 10/2008 | Slobodin et al. |
| 2008/0297878 A1 | 12/2008 | Brown et al. |
| 2008/0303782 A1 | 12/2008 | Grant et al. |
| 2009/0002328 A1 | 1/2009 | Ulrich et al. |
| 2009/0015560 A1 | 1/2009 | Robinson et al. |
| 2010/0231541 A1 | 9/2010 | Cruz-Hernandez et al. |
| 2010/0231550 A1 | 9/2010 | Cruz-Hernandez et al. |
| 2010/0238114 A1 | 9/2010 | Vartanian et al. |
| 2011/0115754 A1 | 5/2011 | Cruz-Hernandez |
| 2012/0133494 A1 | 5/2012 | Cruz-Hernandez et al. |
| 2012/0229400 A1 | 9/2012 | Birnbaum et al. |
| 2012/0268412 A1 | 10/2012 | Cruz-Hernandez et al. |
| 2013/0009882 A1 | 1/2013 | Salmela |
| 2013/0009892 A1* | 1/2013 | Salmela .................. G06F 3/016 345/173 |
| 2013/0076649 A1 | 3/2013 | Myers et al. |
| 2013/0201115 A1 | 8/2013 | Heubel |
| 2014/0049463 A1 | 2/2014 | Seo |

FOREIGN PATENT DOCUMENTS

| | | |
|---|---|---|
| CN | 101739171 A | 6/2010 |
| CN | 102349039 A | 2/2012 |
| JP | 2000-148393 | 5/2000 |
| JP | 2003-060251 | 2/2003 |
| JP | 2003-280546 | 10/2003 |
| JP | 2003-288158 | 10/2003 |
| JP | 2004-071765 | 3/2004 |
| JP | 2005-114796 | 4/2005 |
| JP | 2006-154380 | 6/2006 |
| JP | 2007-121765 | 5/2007 |
| WO | 2013004919 A1 | 1/2013 |

OTHER PUBLICATIONS

Follmer, S. et al., "Jamming User Interfaces: Programmable Particle Stiffness and Sensing for Malleable and Shape-Changing Devices," UIST (2012).

Roudaut, A. and Subramanian S., "Designing and Developing Self-Actuated Flexible Touch Screens," MobileHCI'12 (2012).

International Patent Application No. PCT/US2014/035500, Supplemental European Search Report dated Jan. 11, 2017.

Siemens Wafer-Thin Color Display for Packaging, 2 pages, Feb. 21, 2007.

Visual Planet Touch Foil, 5 pages, Sep. 9, 2007.

E-ink Electronic Paper Displays, 3 pages, Sep. 9, 2007.

Xerox Electronic Reuasble Paper, 2 pages, Feb. 21, 2007.

Fujitsu's Film Substrate-Based Bendable Color Electronic Paper featuring Image Memory Function, 3 pages, Feb. 21, 2007.

NEC's Flexible Battery, 3 pages, Sep. 9, 2007.

Philips Screen, 3 pages, Feb. 21, 2007.

International Search Report and Written Opinion of the International Searching Authority issued in International Application No. PCT/US2014/035500 dated Sep. 23, 2014.

State Intellectual Property Office of the Peoples Republic of China Application No. 201480023079.8, Notification of the First Action, dated Dec. 5, 2017, 15 pages.

\* cited by examiner

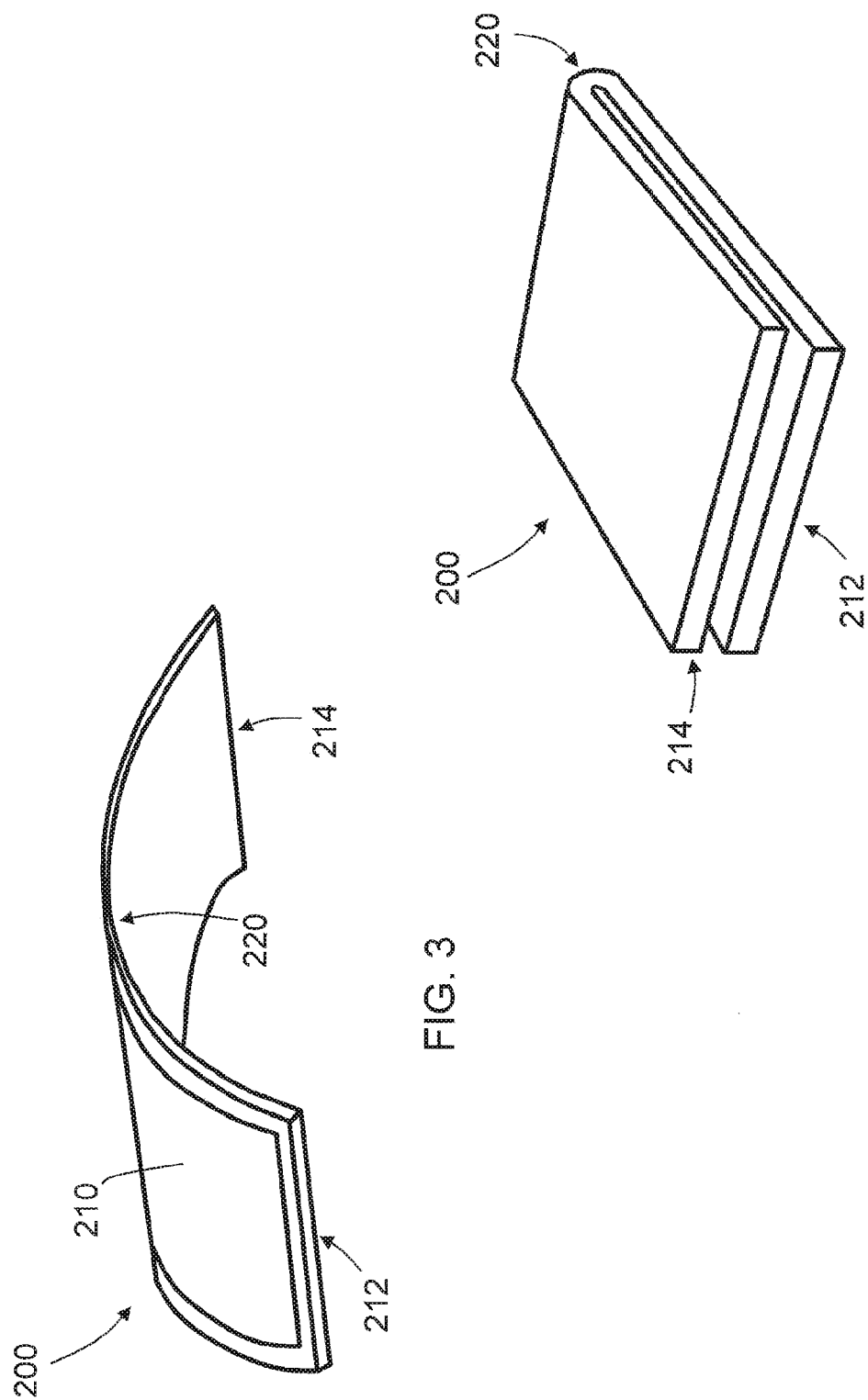

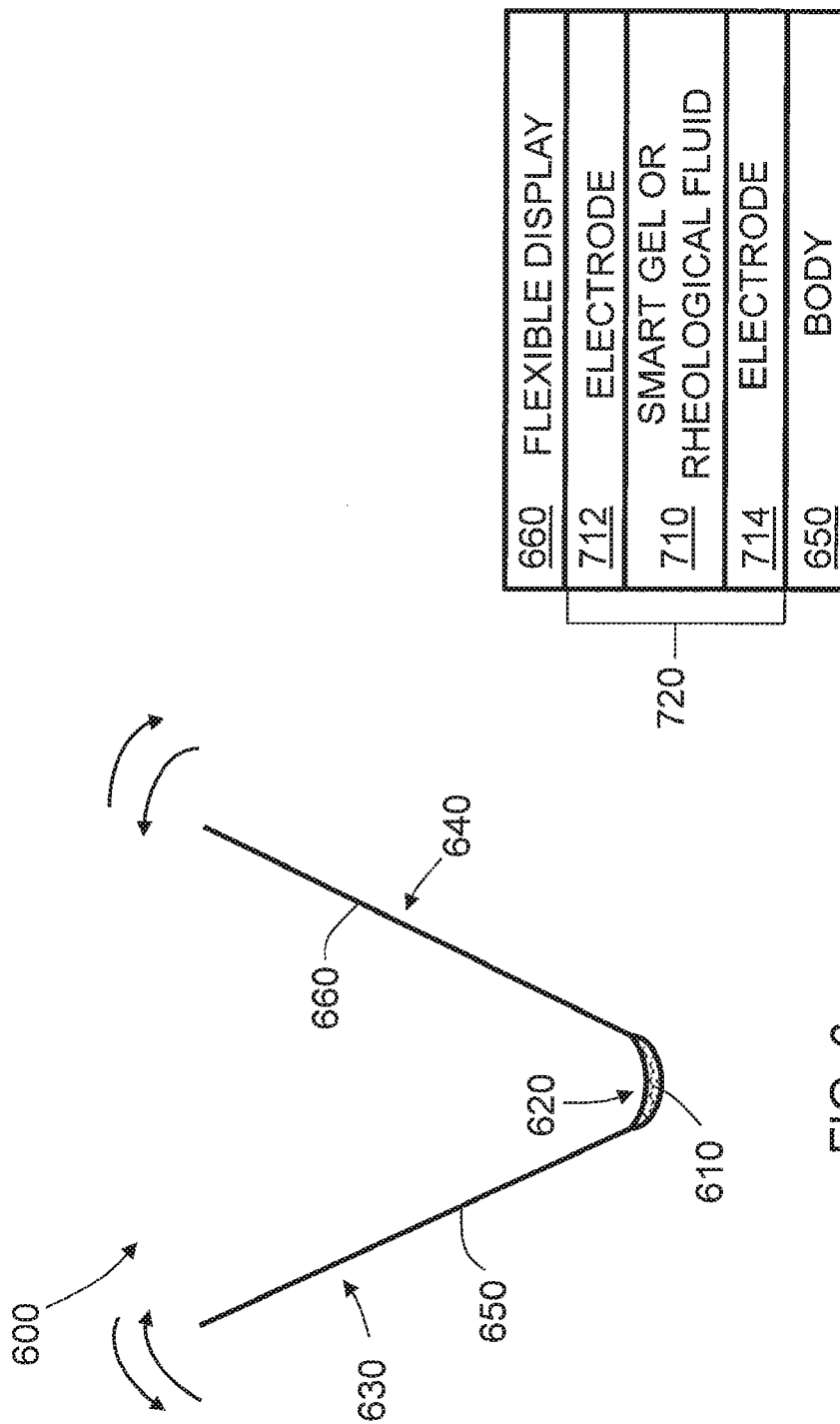

PASSIVE STIFFNESS AND ACTIVE DEFORMATION HAPTIC OUTPUT DEVICES FOR FLEXIBLE DISPLAYS

CROSS-REFERENCE TO RELATED APPLICATIONS

This application is a continuation of and claims priority to U.S. patent application Ser. No. 14/262,403, filed on Apr. 25, 2014, and entitled "Passive Stiffness and Active Deformation Haptic Output Devices for Flexible Displays," which claims priority to U.S. Provisional Patent Application No. 61/816,605, entitled "Haptic Augmentation of Continuous Interactions with Bendable Displays," filed Apr. 26, 2013, the entirety of both of which is hereby incorporated by reference herein.

FIELD

The present invention relates to passive stiffness and active deformation haptic output devices for flexible displays.

BACKGROUND

Flexible displays, which include digital displays that are bendable, foldable and/or rollable are being developed and may enable more intuitive and realistic digital user interface interactions, similar to those occurring in the real world. The use of haptics to augment and enhance such interactions has been limited. Most of the interactions involving flexible displays are characterized by a continuous input in the form of deformation gesture on the display, but such interactions provide the user with only passive haptics, which does not necessarily correspond to, or correlate with the user interface events in the digital environment.

SUMMARY

It is desirable to enable different and additional haptic effects when users interact with flexible displays.

According to an aspect of the present invention, there is provided a system that includes a flexible display configured to display an image and a sensor connected to the flexible display. The sensor is configured to sense an amount of flexure of the flexible display. A haptic output device is connected to the flexible display and is configured to change a resistance to movement of a first portion of the flexible display relative to a second portion of the flexible display upon receipt of a haptic control signal. The system includes a processor in signal communication with the flexible display, the sensor and the haptic output device. The processor is configured to receive an output signal from the sensor based on the amount of flexure and generate the haptic control signal based on the output signal from the sensor.

In an embodiment, the haptic output device is constructed and arranged to change a stiffness of a hinge formed between the first portion and the second portion of the flexible display when at least one of the two portions is moved towards the other of the two portions.

In an embodiment, the haptic output device is configured to lock the hinge when the first portion and the second portion are separated by a predetermined amount of space so that the two portions cannot move relative to each other.

In an embodiment, the haptic output device is constructed and arranged to assist with movement of the first portion relative to the second portion when the sensor senses that the flexible display has been flexed.

In an embodiment, the haptic output device is constructed and arranged to oppose movement of the first portion relative to the second portion when the sensor senses that the flexible display has been flexed.

In an embodiment, the haptic output device includes a smart gel and an activation element constructed and arranged to change a stiffness of the smart gel upon receipt of the haptic control signal.

In an embodiment, the haptic output device includes a rheological fluid and an activation element constructed and arranged to change a viscosity or damping property of the rheological fluid upon receipt of the haptic control signal.

In an embodiment, the haptic output device includes a shape memory alloy and an activation element configured to change a temperature of the shape memory alloy to return the shape memory alloy to its original shape upon receipt of the haptic control signal.

According to an aspect of the invention, there is provided a method that includes sensing an amount of flexure of a flexible display configured to display an image with a sensor, generating a haptic control signal based on the sensed amount of flexure with a processor, and changing a resistance movement of a first portion of the flexible display relative to a second portion of the flexible display with a haptic output device upon receipt of a haptic control signal.

In an embodiment, changing a resistance to movement includes changing a stiffness of a hinge formed between the first portion and the second portion of the flexible display when at least one of the two portions is moved towards the other of the two portions.

In an embodiment, the haptic output device is configured to lock the hinge when the first portion and the second portion are separated by a predetermined amount of space so that the two portions cannot move relative to each other.

In an embodiment, changing a resistance to movement includes reducing the resistance and assisting with movement of the first portion relative to the second portion when the sensor senses that the flexible display has been flexed.

In an embodiment, changing a resistance to movement includes increasing the resistance to oppose movement of the first portion relative to the second portion when the sensor senses that the flexible display has been flexed.

In an embodiment, the haptic output device includes a smart gel and an activation element, and changing a resistance to movement includes causing the smart gel to stiffen upon receipt of the haptic control signal by the activation element.

In an embodiment, the haptic output device includes a rheological fluid and an activation element, and changing a resistance to movement includes causing a viscosity or damping property of the rheological fluid to change upon receipt of the haptic control signal by the activation element.

In an embodiment, the haptic output device includes a shape memory alloy and an activation element, and changing a resistance to movement comprises causing the shape memory alloy to return to its original shape upon receipt of the haptic control signal by the activation element.

These and other aspects, features, and characteristics of the present invention, as well as the methods of operation and functions of the related elements of structure and the combination of parts and economies of manufacture, will become more apparent upon consideration of the following description and the appended claims with reference to the accompanying drawings, all of which form a part of this specification. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

BRIEF DESCRIPTION OF THE DRAWINGS

The components of the following Figures are illustrated to emphasize the general principles of the present disclosure and are not necessarily drawn to scale. Reference characters designating corresponding components are repeated as necessary throughout the Figures for the sake of consistency and clarity.

FIG. 3 schematically illustrates a perspective view of the flexible user interface device of FIG. 2 in a bent configuration;

FIG. 4 schematically illustrates a perspective view of the flexible user interface device of FIG. 2 in a folded configuration;

FIG. 6 schematically illustrates a cross-sectional view of an embodiment of the system of FIG. 1 in the form of a flexible user interface device having a flexible display in a bent configuration;

FIG. 7 schematically illustrates a cross-sectional view of an embodiment of the flexible user interface device of FIG. 6;

DETAILED DESCRIPTION

Figure 1:
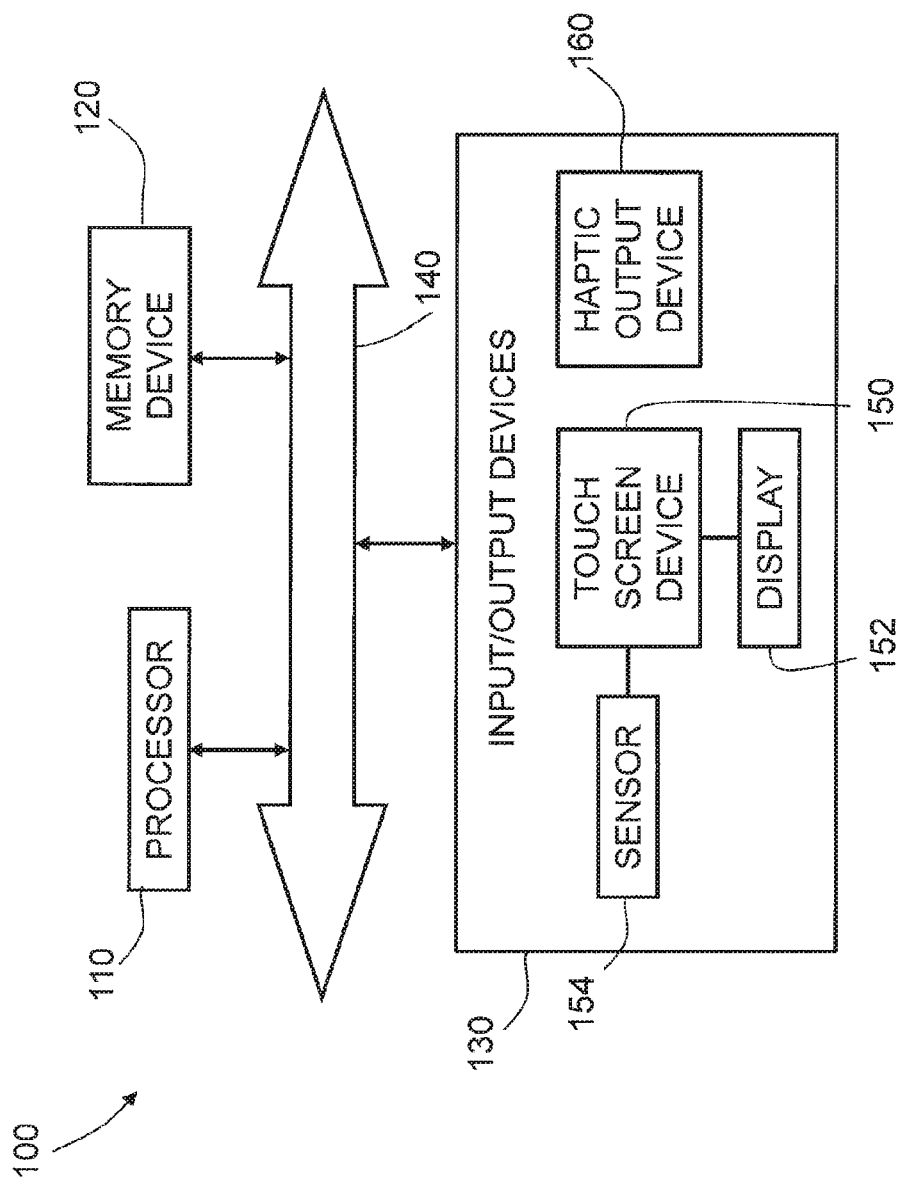
FIG. 1 schematically illustrates a system in accordance with an embodiment of the invention.

FIG. 1 is a schematic illustration of a system 100 in accordance with an embodiment of the invention. As illustrated, the system 100 includes a processor 110, a memory device 120, and input/output devices 130, which are interconnected via a bus 140. In an embodiment, the input/output devices 130 may include a touch screen device 150, a haptic output device 160 and/or other input devices that receive input from a user of the system 100 and output devices that output information to the user of the system 100. In an embodiment, the system 100 may be a user interface device in the form of a touch mobile or tablet device that includes all of the components illustrated in FIG. 1 in a single integrated device. In an embodiment, the system 100 is a single, integrated, flexible device that may be flexed, bent, rolled, folded, etc., as discussed in further detail below.

The touch screen device 150 may be configured as any suitable user interface or touch/contact surface assembly and may be configured for physical interaction with a user-controlled device, such as a stylus, finger, etc. In some embodiments, the touch screen device 150 may include at least one output device and at least one input device. For example, as illustrated the touch screen device 150 includes a visual display 152 configured to display, for example, images and a touch sensitive screen comprising at least one sensor 154 superimposed thereon to receive inputs from a user's finger or stylus controlled by the user. The visual display 152 may include a high definition display screen.

In various embodiments, the haptic output device 160 is configured to provide haptic feedback to the user of the system 100 while the user is in contact with a least a portion of the system 100. For example, the haptic output device 160 may provide haptic feedback to the touch screen device 150 itself to impose a haptic effect when the user is in contact with the touch screen device 150 and/or to another part of the system 100, such as a housing containing at least the input/output devices 130. As discussed in further detail below, the haptic effects may be used to enhance the user experience when interacting with the system 100.

The haptic feedback provided by the haptic output device 160 may be created with any of the methods of creating haptic effects, such as vibration, deformation, kinesthetic sensations, electrostatic or ultrasonic friction, etc. In an embodiment, the haptic output device 160 may include non-mechanical or non-vibratory devices such as those that use electrostatic friction ("ESF"), ultrasonic surface friction ("USF"), or those that induce acoustic radiation pressure with an ultrasonic haptic transducer, or those that use a haptic substrate and a flexible or deformable surface, or those that provide thermal effects, or those that provide projected haptic output such as a puff of air using an air jet, and so on. The haptic output device 160 may include an actuator, for example, an electromagnetic actuator such as an Eccentric Rotating Mass ("ERM") in which an eccentric mass is moved by a motor, a Linear Resonant Actuator ("LRA") in which a mass attached to a spring is driven back and forth, or a "smart material" such as piezoelectric materials, electro-active polymers or shape memory alloys, a macro-composite fiber actuator, an electro-static actuator, an electro-tactile actuator, and/or another type of actuator that provides a physical feedback such as vibrotactile feedback. Multiple haptic output devices 160 may be used to generate different haptic effects.

The processor 110 may be a general-purpose or specific-purpose processor or microcontroller for managing or controlling the operations and functions of the system 100. For example, the processor 110 may be specifically designed as an application-specific integrated circuit ("ASIC") to control output signals to the haptic output device 160 to provide haptic effects. The processor 110 may be configured to decide, based on predefined factors, what haptic effects are to be generated based on a haptic signal received or determined by the processor 110, the order in which the haptic effects are generated, and the magnitude, frequency, duration, and/or other parameters of the haptic effects, The processor 110 may also be configured to provide streaming commands that can be used to drive the haptic output device 160 for providing a particular haptic effect. In some embodiments, the processor 110 may actually include a plurality of processors, each configured to perform certain functions within the system 100. The processor 110 is described in further detail below.

The memory device 120 may include one or more internally fixed storage units, removable storage units, and/or remotely accessible storage units. The various storage units may include any combination of volatile memory and nonvolatile memory. The storage units may be configured to store any combination of information, data, instructions, software code, etc. More particularly, the storage units may include haptic effect profiles, instructions for how the haptic output device 160 is to be driven, or other information for generating haptic effects.

Figure 2:
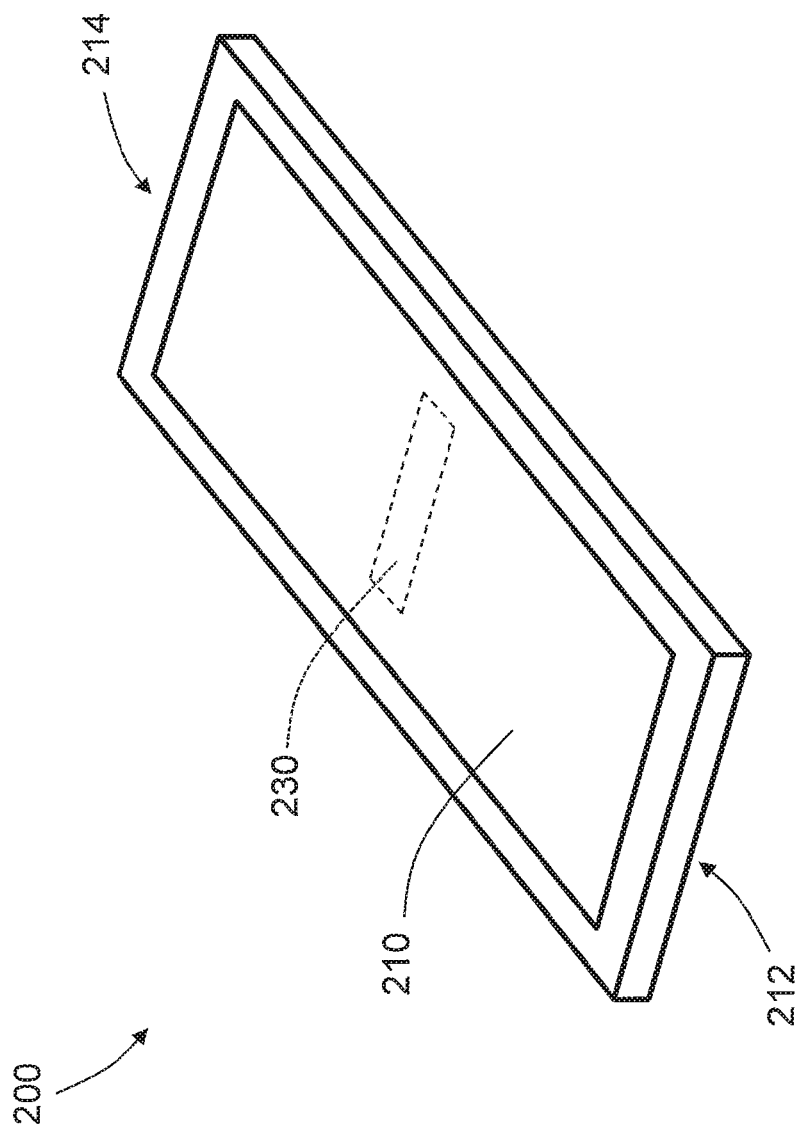
FIG. 2 schematically illustrates a perspective view of an embodiment of the system of FIG. 1 in the form of a flexible user interface device having a flexible display in a flat configuration.

FIG. 2 illustrates an embodiment of the system 100 in the form of a user interface device 200 that includes a flexible display 210. As illustrated in FIG. 3, the entire user interface device 200 is flexible and can be bent with the flexible display 210. In an embodiment, the user interface device 200 may be bent at a hinge 220 and folded such that a first portion 212 of the flexible display 210 and a second portion 214 of the flexible display 210 may contact each other or come close to contacting each other, as illustrated in FIG. 4. A sensor 230 embedded in or otherwise connected to the flexible display 210 is configured to sense the flexure of the flexible display 210. The sensor 230 may include a strain gauge or any other type of sensor that is configured to sense the flexure of the flexible display 210 and/or movement of the first portion 212 of the flexible display 210 relative to the second portion 214 of the flexible display 210.

Figure 5:
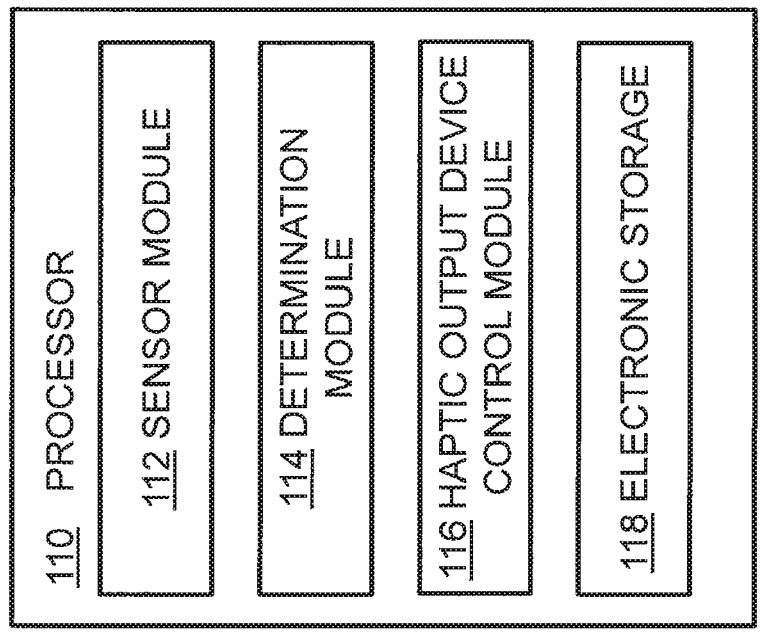
FIG. 5 schematically illustrates a processor of the system of FIG. 1.

FIG. 5 illustrates an embodiment of the processor 110 described above in more detail. The processor 110 may be configured to execute one or more computer program modules. The one or more computer program modules may include one or more of a sensor module 112, a determination module 114, a haptic output device control module 116, and/or other modules. The processor 110 may also include electronic storage 118, which may be the same as the memory device 120 or in addition to the memory device 120. The processor 110 may be configured to execute the modules 112, 114, and/or 116 by software, hardware, firmware, some combination of software, hardware, and/or firmware, and/or other mechanisms for configuring processing capabilities on processor 110.

It should be appreciated that although modules 112, 114, and 116 are illustrated in FIG. 2 as being co-located within a single processing unit, in embodiments in which the processor 110 includes multiple processing units, one or more of modules 112, 114, and/or 116 may be located remotely from the other modules. The description of the functionality provided by the different modules 112, 114, and/or 116 described below is for illustrative purposes, and is not intended to be limiting, as any of the modules 112, 114, and/or 116 may provide more or less functionality than is described. For example, one or more of the modules 112, 114, and/or 116 may be eliminated, and some or all of its functionality may be provided by other ones of the modules 112, 114, and/or 116. As another example, the processor 110 may be configured to execute one or more additional modules that may perform some or all of the functionality attributed below to one of the modules 112, 114, and/or 116.

The sensor module 112 is configured to receive an input signal from the sensor 154 that is generated when the sensor 154 detects an input from a user of the system 100. In embodiments in which there are multiple sensors, the sensor module 112 is configured to receive and process input signals from the multiple sensors. The sensor module 112 may be configured to determine whether the sensed input is an intentional input or merely an inadvertent touch to the touch screen device 150 by comparing the strength of the input signal or the pattern or location of the input signal to a predetermined threshold strength that corresponds to an intentional input. In addition, the sensor module 112 is configured to receive an input signal from the sensor 230 that is generated when the flexible user interface device 200 is flexed, which may occur when the user interface device 200 is bent, folded or rolled, for example. The sensor module 112 is also configured to send a signal to the determination module 114 for further processing.

The determination module 114 is configured to determine what was intended by the user when providing an input to the sensor 154. For example, the user may touch a certain location of the touch screen device 150 or provide a particular gesture to the touch screen device 150, or bend the user interface device 200 in a certain manner that indicates that a certain function is to be performed by the user interface device 200. The determination module 114 may be programmed with a library of predetermined gestures and touch locations on the touch screen device 150 so that when the user touches a particular location on the touch screen device 150 or provides a gesture to the touch screen device 150, the determination module 114 may determine a corresponding output. When the user flexes the system 100 (or user interface device 200), if the sensor 154, 230 senses an amount of flexure that exceeds a predetermined amount, it may be determined that the user is in the process of folding the system 100 or user interface device 200, for example at the hinge 220, and the flexible display 210 should be powered off. In addition, the determination module 114 may also output a signal to the haptic output device control module 116 so that a haptic effect in accordance with embodiments of the invention described below may be provided to the user.

The haptic output device control module 116 is configured to receive the output signal from the determination module 114 and determine the haptic effect to be generated by the haptic output device 160, based on the signal generated by the determination module 114.

In an embodiment of the invention, the system 100 may be a flexible user interface device 600, as illustrated in FIG. 6 that includes a haptic output device 610 that is embedded within a hinge 620 of the flexible user interface device 600. The hinge 620 of the flexible user interface device 600 may be considered to be the location where a first portion 630 and a second portion 640 of the flexible user interface device 600 may pivot or rotate and move towards each other, or away from each other, as the flexible user interface device 600 is flexed or bent or folded, as illustrated in FIG. 6. In an embodiment, the flexible user interface device 600 may be configured to fold at the hinge 620 when the two portions 630, 640 of the device 600 located on opposite sides of the hinge 620 are brought towards each other.

In an embodiment, the haptic output device 610 may be embedded within a body or housing 650 of the device 600 that supports a flexible display 660 or may be coupled to the body or housing 650 of the device 600. The haptic output device 610 may be in the form of a fluidic actuator that includes a smart gel or rheological fluid and an activation element, as discussed in further detail below.

A smart gel, which includes a fluid basis (typically water) within or surrounding a matrix of polymer, is characterized by its ability to quickly change mechanical and/or structural properties upon exposure to certain physical and/or chemical external stimuli, such as an electric or magnetic field, temperature, (UV-) light, shaking, pH variation, etc. The response or reaction of smart gels to such stimuli is expansion or contraction, which is typically caused by the polymer matrix becoming more or less hydrophilic and absorbing or releasing more molecules from or to the gel. By making non-homogeneous gels with different rates of expansion/contraction, a controlled stimulus (e.g. voltage-controlled electric field) may cause the gel to bend and/or stiffen by a certain controlled amount. A subclass of smart gels is so-called shake gels, which stiffen when exposed to mechanical impact or when strongly shaken.

A smart gel may comprise a temperature-sensitive hydrogel that is configured to expand and stiffen when heated above a threshold temperature, and contract and relax when cooled down below the threshold temperature. The smart gel may be configured to respond to another stimulus besides temperature, such as electrical current, light, salt, and chemical stimuli. The system 100 may include activating elements to introduce an appropriate stimulus to achieve a desired response by the smart gel. For example, if the smart gel is configured to deform as a function of light, the system 100 may include an element to stimulate the smart gel by directing light toward the smart gel. In an embodiment in which the smart gel responds to a chemical stimulus, an injection device may be used to introduce a chemical agent to the smart gel, such as an agent that changes the smart gel pH, a salt, glucose, ions, etc. In an embodiment in which the smart gel responds to an electrical stimulus, wires or other elements may be embedded in the smart gel or electrodes may be used to direct current through the smart gel and/or to apply an electric field to the smart gel.

Rheological fluids are another category of fluidic actuators and typically include iron particles suspended in oil or watery fluid. Upon exposure to electric (for electro-rheological fluids) or magnetic (for magneto-rheological fluids) fields, the order of molecules in the liquid aligns itself to the field main axis. This phenomenon causes the overall damping and/or viscosity of the fluid to change, up to the point that if the field strength is high enough, the rheological fluid may turn into a solid fairly quickly.

Returning to FIG. 6, in an embodiment, the flexible user interface device 600 may not have a predefined hinge 620. Instead, the area corresponding to the hinge 620 in FIG. 6 may be filled with smart gel or rheological fluid. If the smart gel or rheological fluid is activated, as described above, and increased in stiffness, a temporary hinge may be created to divide the device 600 into two halves, such as the first portion 630 and the second portion 640, which can rotate around the newly created hinge. As soon as the actuation turns off, the hinge may soften and eventually disappear.

In an embodiment, a layer 710 filled with a smart gel or rheological fluid and flexible electrodes 712, 714 on each side (to form a haptic output device in the form of a fluidic actuator 720) may extend across the whole surface of the body 650 under the flexible display 660, as schematically illustrated in FIG. 7. By activating and thereby stiffening an arbitrary strip of the fluid, a temporary hinge can be created at an arbitrary location, with an arbitrary orientation (horizontal, lateral, diagonal, curved, etc.).

Figure 8:
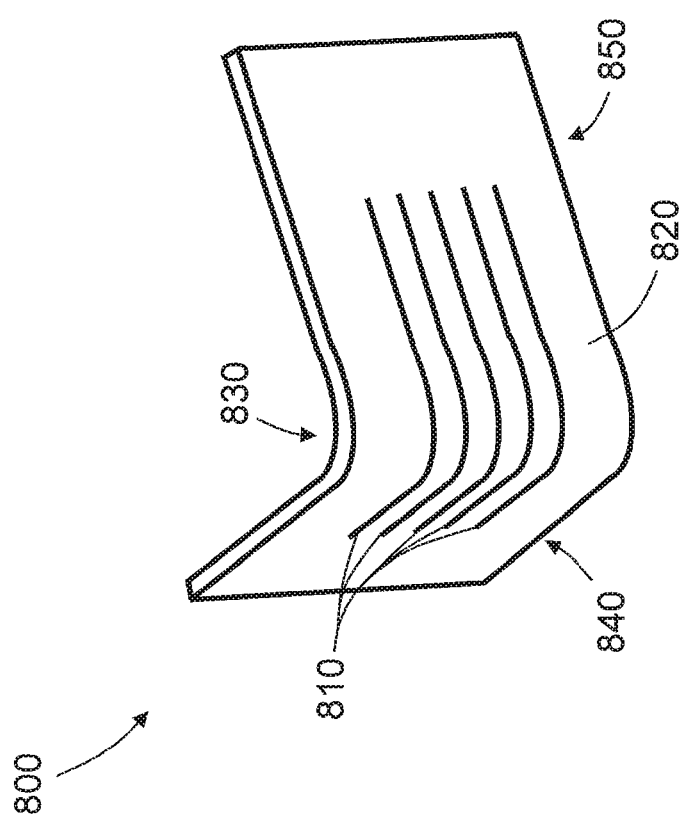
FIG. 8 schematically illustrates a perspective view of an embodiment of the system of FIG. 1 in the form of a flexible user interface device having a flexible display in a bent configuration.

FIG. 8 illustrates an embodiment of the system 100 in the form of a flexible user interface device 800 that includes a plurality of haptic output devices 810 embedded in a flexible body 820 and a hinge location 830 of the device 800. As illustrated, the haptic output devices 810 extend from a first portion 840 of the body 820, across the hinge location 830 to a second portion 850 of the body 820. Although five haptic output devices 810 are illustrated, more or less haptic output devices 810 may be used. The illustrated embodiment is not intended to be limiting in any way. The haptic output devices 810 may include shape memory alloys, such as in the form of shape memory alloy fibers, and one or more activation elements configured to heat the shape memory alloy fibers, which may cause the fibers to return to their original shape. For example, if the user interface device 800 is flexed to the condition illustrated in FIG. 8, which may be sensed by a sensor embedded in the device, the processor 110 may generate a haptic control signal that activates the activation element, for example, passing current through the element, and cause the shape memory alloy fiber(s) to straighten, which would cause the user interface device 800 to move back to a substantially flat configuration, similar to the configuration illustrated in FIG. 2.

In an embodiment, by having the shape memory alloy fibers extend around the hinge, as illustrated in FIG. 8, the shape memory alloy fibers may be configured to resist against elongation and thus generate a haptic effect that opposes the two halves of the device from closing. In an embodiment, upon activation, the shape memory alloys may shorten, thereby leading to an active kinesthetic haptic effect in the form that may bring the two portions 840, 850 of the device 800 towards each other and fold the device 800 at the hinge location 830. In an embodiment, the haptic output devices 810 may include macro fiber composite ("MFC") piezoelectric fibers that are embedded around and within the hinge location 820 of the device 800.

Figure 10:
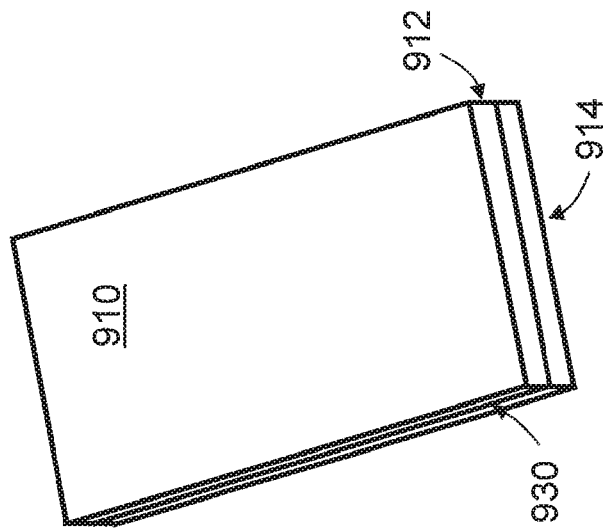
FIG. 10 schematically illustrates a perspective view of an embodiment of the user interface device of FIG. 9 in a closed position.
Figure 9:
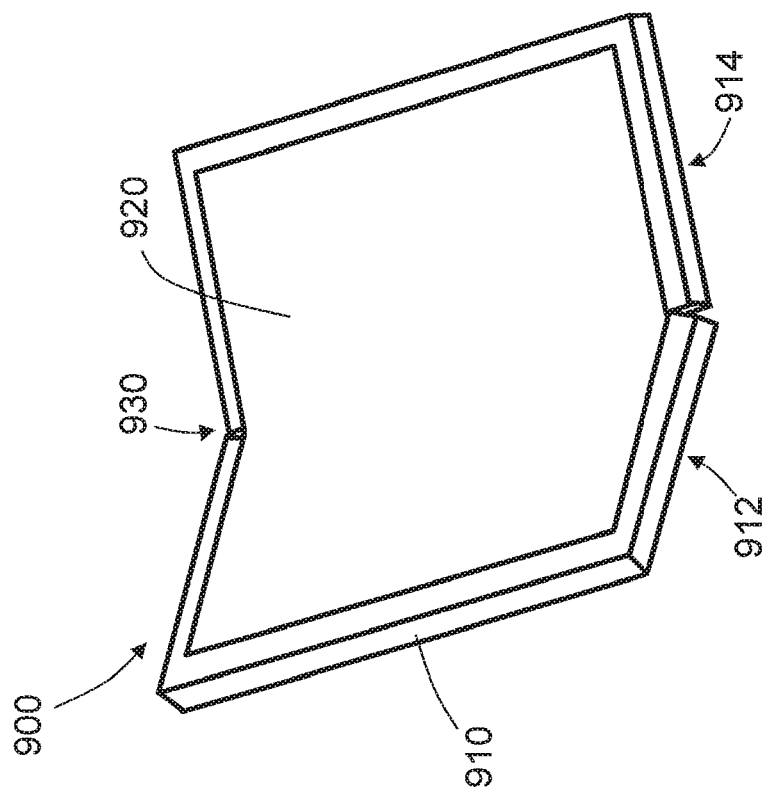
FIG. 9 schematically illustrates a perspective view of an embodiment of the system of FIG. 1 in the form of a foldable user interface device having a flexible display and a rigid housing in an open position.

FIG. 9 illustrates an embodiment of the system 100 in the form of a user interface device 900 that includes a rigid housing 910 that supports a flexible display 920. At least one haptic output device (not shown in FIG. 9) may be used to assist the user to move a first portion 912 of the housing 910 towards a second portion 914 of the housing 910 that is on an opposite side of a hinge 930 provided by the flexible display 920 so that the user interface device 900 may be moved from an open state, as illustrated in FIG. 9, to a closed state, as illustrated in FIG. 10. Once the user interface device 900 is in the closed state, a haptic output device in accordance with embodiments of the invention described herein may be actuated so that the hinge 930 locks the user interface device 900 in the closed position. In an embodiment, the hinge 930 of the flexible display 920 may be haptically enabled using a combination of haptic output devices in the forms of an electric motor and a smart gel based actuator. The electric motor may be used to create active deformation and assist with the opening or closing of the foldable device, while the smart gel based actuator may lock the configuration in place, thereby preventing the foldable display from opening or closing.

In an embodiment, the rotating motion of the first and second portions of the display or device around the hinge 930 may involve frictional and/or sliding contact among the subcomponents in the hinge. The effective friction coefficient seen by the subcomponents may be modulated (e.g., reduced) if ultrasound vibration is applied on their surfaces, which may allow for a hinge-based programmable resistance to be created and displayed to the user as he/she is opening or closing the two halves of the flexible display.

In an embodiment of the invention, a fluidic actuator based on smart gels or rheological fluid, described above, may be mounted to the back surface of a rollable display. Driving such an actuator may produce programmable resistive (passive) or active haptic effects on the rolling degree of freedom of the display.

In an embodiment, the haptic output device may include an electro-mechanical actuator to provide a mini resistive haptic effect along a large hinge. In an embodiment, an ultrasonic motor may be located in an area with high friction and may generate ultrasonic vibrations when activated to reduce the friction. In an embodiment, a shape memory alloy in the form of a wire may be used to oppose user movement. In an embodiment, an actuator configured to deform and sustain the deformation when the user interacts with the device, such as a piezoelectric or MFC actuator, may be used. In an embodiment, a smart gel or rheological fluid that is embedded in the back of the display may be configured to change the stiffness or damping of the surface of the display when activated. In an embodiment, the haptic output device may be configured to generate haptic effects with faster dynamics. For example, the haptic output device may be configured to generate a relatively fast "pop"-like haptic effect that simulates the sensation of "snapping" a foldable device open and/or closed, such as when a laptop computer is opened or closed. Haptic effects may be generated using one or a combination of the above-described technologies, in accordance with embodiments of the invention described herein.

Embodiments of the invention described above may be used to generate both passive and active haptic effects, depending on a mode of operation. As used herein, "passive" haptic effects on the flexible display may be generated by a change in mechanical stiffness/damping of the haptic output device embedded in the hinge or body of the device, and "active" haptic effects on the flexible display may be generated when the haptic output device that is embedded in the hinge or body of the device actively bends the display.

Passive haptic effects may cause the perceived structural stiffness/damping of the display to change, which allows for delivering programmable structural resistance against deformation gestures (e.g., bending the display) applied by the user. In addition, the passive kinesthetic haptic effects that are created may be used to enable a variety of interaction parameters and/or schemes, For example, in an embodiment, a controlled and gradual increase of the perceived stiffness or firmness and damping factor of the display (versus its physical value) may be generated. In an embodiment, a controlled and gradual decrease of the perceived stiffness/damping from its physical value may be generated by applying bending force towards the bending direction and thus facilitating the gesture and interaction for the user.

In a passive mode of operation, programmable resistance haptic effects may be delivered to the user as he/she bends or folds the device. This programmable resistance may be generated by driving the haptic output device located in the hinge in a programmable manner, for example by exposing the smart gel or rheological fluid to a controlled electric or magnetic field. Based on this configuration, a vast array of kinesthetic haptic effects and schemes may be enabled, which may increase the breadth and depth of gestures and interactions involving flexible displays. For example, in an embodiment, a controlled and gradual increase of the perceived damping factor of the display, as opposed to its physical value, may be generated. In an embodiment, mechanical detents during the bending motion may be generated, as long as the response time of the haptic output device is faster than the bending gesture of the user. In an embodiment, the locking or holding (i.e. solidifying) of the display in a certain position may be generated. In an embodiment, the range of the bending and/or the extent of the bending may be limited to a certain threshold. In an embodiment, an isolated, locally rigid section or patch or line on the display may be created. In an embodiment, the deformation restoration rate, i.e. how fast/slow a deformed part springs back to its neutral state, if restored back at all, may be adjusted.

With active haptic effects, the device/display itself may actively apply force along the deformation degree of freedom (e.g., bending). This force may be opposite or in line with the external gesture force applied by the user (if any), and may or may not result in actual deformation (i.e. shape change) of the device and display.

In the active mode of operation, the haptic output device may generate a bending or folding force on the display, which, as opposed to the passive mode, is not a pure resistance. The active mode haptic effects may be enabled, for example, with electromechanical actuators, shape memory alloys, MFC actuators, etc.

Embodiments of the present invention may provide an advantage by providing an increase in flexibility of the haptic output device by using smart gels, rheological fluids, shape memory alloys, MFC, etc., and thus its compatibility with flexible surfaces and compact design. In addition, embodiments of the invention may satisfy the space constraints in mobile user interface devices by embedding the haptic output device in the hinge or surface of the device, which may provide a potential power savings by using a combination of actuation techniques. For example, a DC motor may be used to rotate portions of the flexible user interface device, while a smart gel or an electro-rheological fluid may be used to lock the configuration in place.

Embodiments of the invention that provide programmable kinesthetic haptic effects on flexible displays by using the actuation components described herein may expand the breadth and depth of the user interactions and enhance the user experience with flexible displays. By controlling the resistance or stiffness of the display, the utility of the display may be facilitated. For example, typing on a touchscreen may be easier if the device is rigid and zooming an image output by the flexible display may be easier by bending the display, which requires a softer, less rigid display. In addition, by reducing the perceived deformation firmness and assisting the user by applying a bending force in the direction of a bending gesture, the user may experience less fatigue.

Embodiments of the present invention may enable several haptic experiences, including controlled and gradual increase of the perceived damping factor of the display, mechanical detents on bending motion, locking/holding (solidifying) the display in a certain position, limiting the range of bending range and extent to a certain threshold, creating isolated, locally rigid sections/patches/lines on the display, and adjusting the deformation restoration rate, i.e. how fast or slow the deformed parts spring back to their neutral state, if restored back at all.

The embodiments described herein represent a number of possible implementations and examples and are not intended to necessarily limit the present disclosure to any specific embodiments. Instead, various modifications can be made to these embodiments as would be understood by one of ordinary skill in the art. Any such modifications are intended to be included within the spirit and scope of the present disclosure and protected by the following claims.

What is claimed is:

1. A system comprising:
   a flexible display;
   a sensor connected to the flexible display, the sensor configured to sense an amount of flexure of the flexible display and transmit an output signal associated with the amount of flexure;
   a haptic output device connected to the flexible display, the haptic output device configured to resist a movement of a first portion of the flexible display relative to a second portion of the flexible display in response to a haptic control signal;
   a processor in signal communication with the flexible display, the sensor and the haptic output device; and
   a memory on which instructions executable by the processor are stored to cause the processor to:

receive the output signal from the sensor;
determine a haptic effect to resist the flexure of the flexible display with an amount of resistance that is based on the output signal from the sensor;
generate the haptic control signal based on the haptic effect; and
transmit the haptic control signal to the haptic output device.

2. The system according to claim 1, wherein the memory further comprises instructions that are executable by the processor to cause the processor to:
cause the haptic output device to change a stiffness of a hinge formed between the first portion and the second portion of the flexible display in response to at least one of the two portions being moved towards the other of the two portions.

3. The system according to claim 2, wherein the memory further comprises instructions that are executable by the processor to cause the processor to:
cause the haptic output device to lock the hinge in response to the first portion and the second portion being separated by a predetermined amount of space so that the two portions cannot move relative to each other.

4. The system according to claim 1, wherein the memory further comprises instructions that are executable by the processor to cause the processor to:
determine a haptic effect to assist with the flexure of the flexible display in response to the output signal from the sensor indicating that the flexible display has been flexed.

5. The system according to claim 1, wherein the memory further comprises instructions that are executable by the processor to cause the processor to:
determine the haptic effect to resist the flexure of the flexible display in response to the output signal from the sensor indicating that the flexible display has been flexed.

6. The system according to claim 1, wherein the haptic output device comprises a smart gel and an activation element constructed and arranged to change a stiffness of the smart gel in response to the haptic control signal.

7. The system according to claim 1, wherein the haptic output device comprises a rheological fluid and an activation element constructed and arranged to change a viscosity or damping property of the rheological fluid in response to the haptic control signal.

8. The system according to claim 1, wherein the haptic output device comprises a shape memory alloy and an activation element configured to change a temperature of the shape memory alloy to return the shape memory alloy to its original shape in response to the haptic control signal.

9. A method comprising:
receiving, from a sensor and by a processor, an output signal associated with an amount of flexure of a flexible display;
determining, by the processor, a haptic effect to resist the flexure of the flexible display with an amount of resistance that is based on the output signal from the sensor;
generating, by the processor, a haptic control signal based on the haptic effect; and
transmitting, by the processor, the haptic control signal to a haptic output device configured to resist a movement of a first portion of the flexible display relative to a second portion of the flexible display in response to the haptic control signal.

10. The method according to claim 9, further comprising resisting the movement of the first portion relative to the second portion by changing a stiffness of a hinge formed between the first portion and the second portion of the flexible display in response to at least one of the two portions being moved towards the other of the two portions.

11. The method according to claim 10, further comprising locking the hinge in response to the first portion and the second portion being separated by a predetermined amount of space so that the two portions cannot move relative to each other.

12. The method according to claim 9, further comprising determining a haptic effect to assist with the flexure of the flexible display in response to the sensor sensing that the flexible display has been flexed.

13. The method according to claim 9, further comprising determining the haptic effect to resist the flexure of the flexible display in response to the sensor sensing the flexible display has been flexed.

14. The method according to claim 9, wherein the haptic output device comprises a smart gel and an activation element, and wherein changing a resistance to movement comprises causing the smart gel to stiffen in response to the haptic control signal by the activation element.

15. The method according to claim 9, wherein the haptic output device comprises a rheological fluid and an activation element, and wherein changing a resistance to movement comprises causing a viscosity or damping property of the rheological fluid to change in response to the haptic control signal by the activation element.

16. The method according to claim 9, wherein the haptic output device comprises a shape memory alloy and an activation element, and wherein changing a resistance to movement comprises causing the shape memory alloy to return to its original shape in response to the haptic control signal by the activation element.

17. A non-transitory computer readable medium comprising program code, which when executed by a processor is configured to cause the processor to:
receive, from a sensor, an output signal associated with an amount of flexure of a flexible display;
determine a haptic effect to resist the flexure of the flexible display with an amount of resistance that is based on the output signal from the sensor;
generate a haptic control signal based on the haptic effect; and
transmit the haptic control signal to a haptic output device configured to resist a movement of a first portion of the flexible display relative to a second portion of the flexible display in response to the haptic control signal.

18. The non-transitory computer readable medium of claim 17, further comprising program code which when executed by the processor is configured to cause the processor to
cause the haptic output to change a stiffness of a hinge formed between the first portion and the second portion of the flexible display in response to at least one of the two portions being moved towards the other of the two portions.

19. The non-transitory computer readable medium of claim 18, further comprising program code which when executed by the processor is configured to cause the processor to:
cause the haptic output device to lock the hinge in response to the first portion and the second portion being separated by a predetermined amount of space so that the two portions cannot move relative to each other.

20. The non-transitory computer readable medium of claim 17, further comprising program code which when executed by the processor is configured to cause the processor to:
   determine a haptic effect to assist with the flexure of the flexible display in response to the output signal from the sensor indicating that the flexible display has been flexed.

21. The non-transitory computer readable medium of claim 17, further comprising program code which when executed by the processor is configured to cause the processor to:
   determine the haptic effect to resist the flexure of the flexible display in response to the output signal from the sensor indicating that the flexible display has been flexed.

22. The non-transitory computer readable medium of claim 17, wherein the haptic output device comprises a smart gel and an activation element constructed and arranged to change a stiffness of the smart gel in response to the haptic control signal.

23. The non-transitory computer readable medium of claim 17, wherein the haptic output device comprises a rheological fluid and an activation element constructed and arranged to change a viscosity or damping property of the rheological fluid in response to the haptic control signal.

24. The non-transitory computer readable medium of claim 17, wherein the haptic output device comprises a shape memory alloy and an activation element configured to change a temperature of the shape memory alloy to return the shape memory alloy to its original shape in response to the haptic control signal.

25. The system according to claim 2, wherein the memory further comprises instructions that are executable by the processor to cause the processor to:
   transmit a haptic signal to another haptic output device configured to modulate a coefficient of friction associated with the hinge by applying ultrasonic vibrations to the hinge.

26. The system according to claim 1, wherein the haptic effect comprises gradually increasing or gradually decreasing a damping factor of the flexible display in an amount associated with the amount of flexure of the flexible display.

27. The system according to claim 1, wherein the memory further comprises instructions that are executable by the processor to cause the processor to:
   determine that an input detected by the sensor is an intentional input or an inadvertent input based on the output signal from the sensor.

* * * * *